(12) United States Patent
Lovett et al.

(10) Patent No.: US 6,277,165 B1
(45) Date of Patent: Aug. 21, 2001

(54) VACUUM CLEANER BAG

(76) Inventors: Donna M. Lovett, 1012 Columbus Ct., Newton, KS (US) 67114; Robert R. Lovett, 4254 5th Ave., Suite B204, Lake Charles, LA (US) 70607

( * ) Notice: Subject to any disclaimer, the term of this patent is extended or adjusted under 35 U.S.C. 154(b) by 0 days.

(21) Appl. No.: 09/558,608

(22) Filed: Apr. 26, 2000

(51) Int. Cl.[7] .................................................. B01D 46/02
(52) U.S. Cl. .............................. 55/374; 55/361; 55/377; 55/DIG. 2
(58) Field of Search ........................... 55/361, 369, 375, 55/377, DIG. 2, DIG. 3, 374

(56) References Cited

U.S. PATENT DOCUMENTS

| | | | |
|---|---|---|---|
| 4,070,170 | * 1/1978 | Veiwfelt | ...................... 55/DIG. 34 |
| 5,400,465 | * 3/1995 | Bosses et al. | ...................... 55/DIG. 2 |
| 5,464,460 | * 11/1995 | Bosses | .............................. 55/DIG. 2 |
| 5,613,989 | 3/1997 | Bosses . | |
| 6,033,451 | 3/2000 | Fish et al. . | |
| 6,192,787 | * 2/2001 | Dyson et al. | ...................... 55/DIG. 2 |

* cited by examiner

Primary Examiner—David A. Simmons
Assistant Examiner—Minh-Chau T. Pham
(74) Attorney, Agent, or Firm—Joseph N. Breaux

(57) ABSTRACT

An improved vacuum cleaner bag with a mechanism for allowing the user to visually align the coupling opening of the vacuum cleaner bag with the discharge tube of a vacuum cleaner. The vacuum cleaner bag also includes a discharge tube receiving structure positioned opposite the coupling opening for receiving the tube end of the discharge tube when the collar surrounding the coupling opening is being positively seated around a base end of the discharge tube.

4 Claims, 4 Drawing Sheets

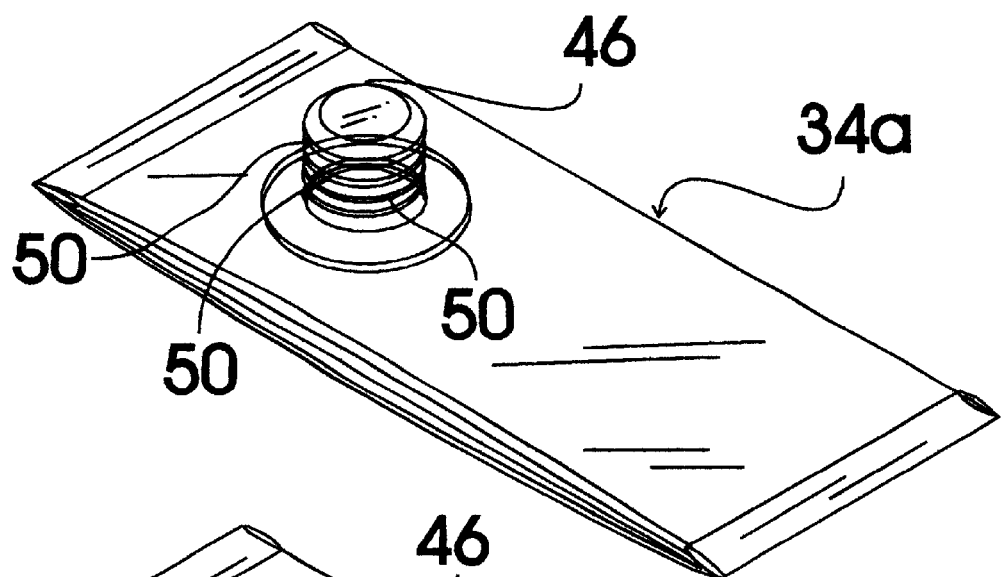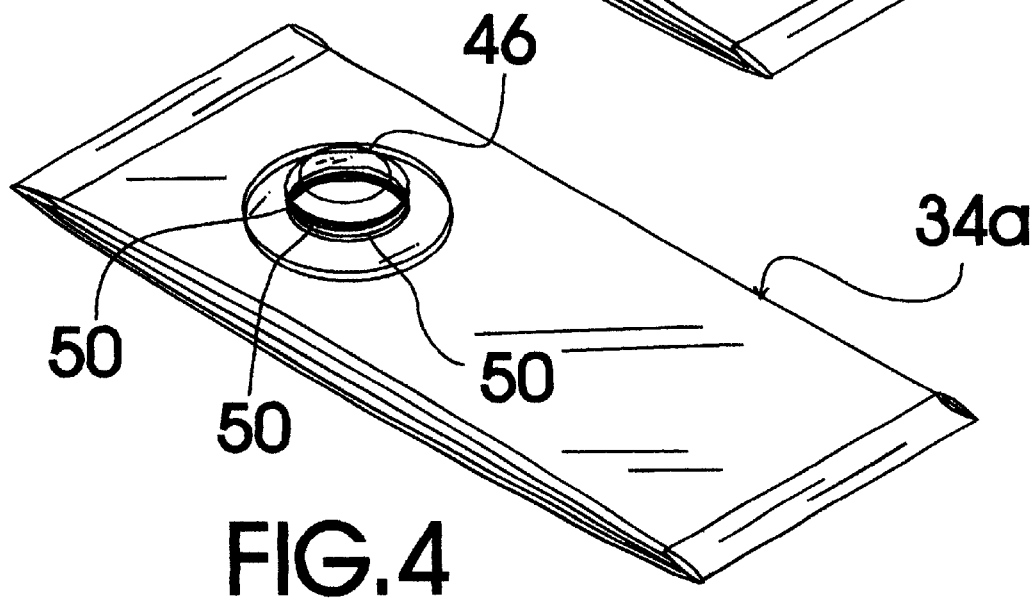

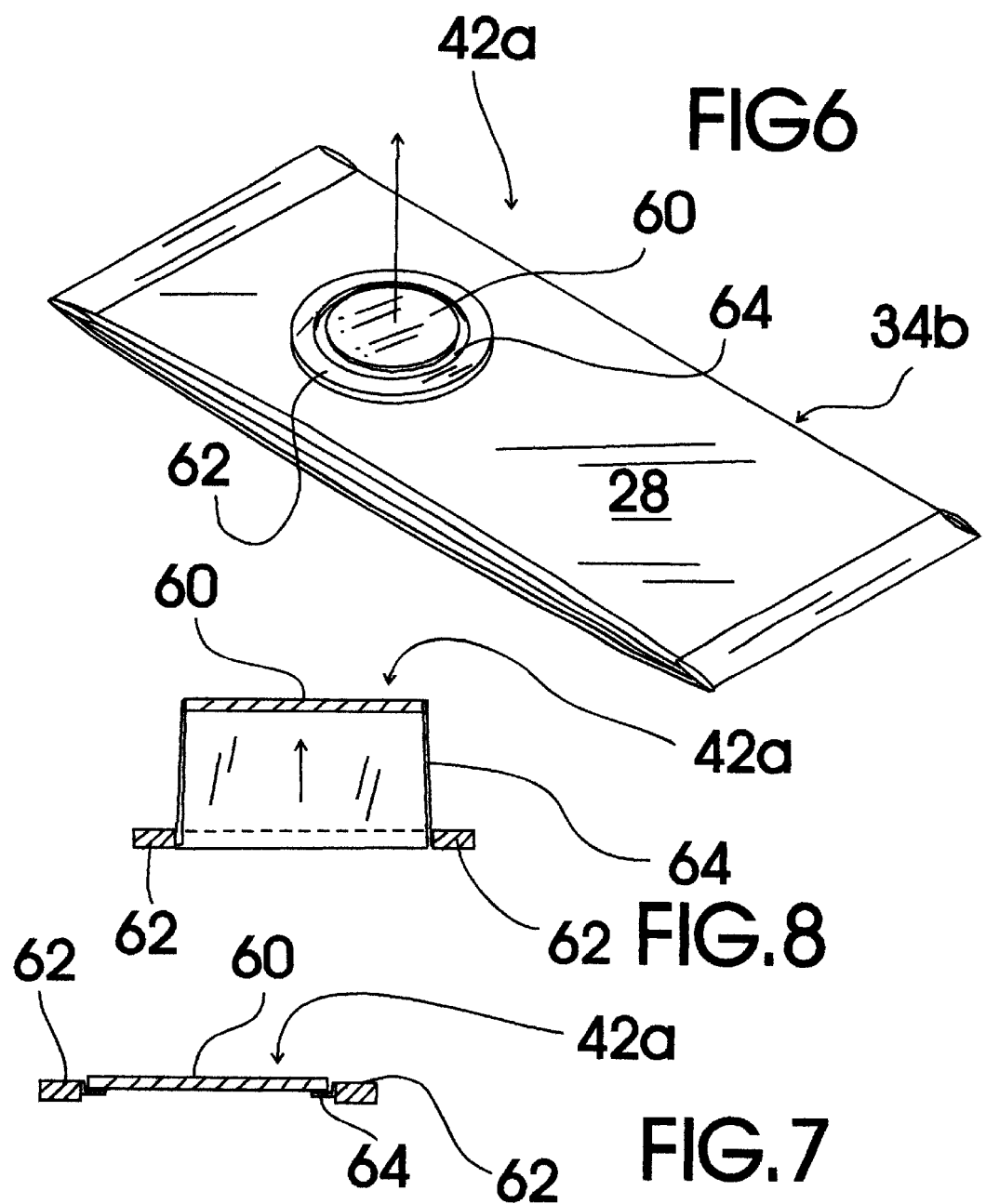

VACUUM CLEANER BAG

TECHNICAL FIELD

The present invention relates to disposable vacuum cleaner bags and more particularly to a vacuum cleaner bag that is attachable to the discharge tube of a vacuum cleaner and which includes the improvement of having a transparent structure provided opposite the conventionally provided coupling opening for allowing the user to visually identify and align the coupling opening with the discharge tube of the vacuum cleaner during installation of the vacuum cleaner bag as well as defining a tube end receiving cavity for receiving the tube end of the discharge tube of the vacuum cleaner so that a collar surrounding the coupling opening of the vacuum cleaner bag may be positively and effectively seated onto the discharge tube without the fear that excessive pushing on the vacuum cleaner bag during installation will cause the discharge tube to rupture a wall of the vacuum cleaner bag located opposite the coupling opening.

BACKGROUND ART

Disposable vacuum cleaner bags typically have a collar surrounding a coupling opening that must be seated over a tube end of a vacuum cleaner discharge tube that extends into the vacuum cleaner bag holding chamber. This is a cumbersome task because the coupling opening is typically on a surface of the vacuum cleaner bag facing away from the user and toward an enclosure wall from which the vacuum cleaner discharge tube extends. It would be a benefit, therefore, to have a vacuum cleaner bag with a mechanism for allowing the user to visually align the coupling opening with the discharge tube of the vacuum cleaner. In addition, because many users fear that applying the positive force necessary to seat the collar onto the discharge tube will force discharge tube through the facing wall of the newly installed vacuum cleaner bag, it would be a further benefit to have a vacuum cleaner bag that included a discharge tube receiving structure positioned opposite the coupling opening for receiving the tube end of the discharge tube when the collar is being positively seated around a base end of the discharge tube.

GENERAL SUMMARY DISCUSSION OF INVENTION

It is thus an object of the invention to provide an improved vacuum cleaner bag that includes a mechanism for allowing the user to visually align the coupling opening with the discharge tube of the vacuum cleaner.

It is a further object of the invention to provide an improved vacuum cleaner bag that includes a discharge tube receiving structure positioned opposite the coupling opening for receiving the tube end of the discharge tube when the collar is being positively seated around a base end of the discharge tube.

It is a still further object of the invention to provide an improved vacuum cleaner bag that accomplishes all or some of the above objects in combination.

Accordingly, an improved vacuum cleaner bag is provided. The improvement is for a vacuum cleaner bag for use with a vacuum cleaner having a discharge tube, the vacuum cleaner bag including a bag portion formed from a filtering material and having a first exterior surface to which a substantially rigid collar surrounding a coupling opening through the first exterior surface thereof into an interior dirt trapping chamber of the bag portion and through which a tube end of the discharge tube of the vacuum cleaner is inserted to couple the vacuum cleaner bag to the vacuum cleaner and a second exterior surface positioned opposite the coupling opening. The improvement to the vacuum cleaner bag includes a tube passage opening formed through the second exterior surface and concentrically aligned with the coupling opening and sized to allow passage therethrough of the tube end of the discharge tube; and a discharge tube receiving structure attached to the second exterior surface of the bag portion surrounding the tube passage opening and defining a tube end receiving cavity exteriorly of the interior dirt trapping chamber for receiving the tube end when the tube end is sequentially inserted through the coupling opening and then the tube passage opening; the discharge tube receiving structure including a transparent portion positioned to allow a user to see simultaneously through the discharge tube receiving structure, the tube passage opening and the coupling opening to accurately align the coupling opening with the tube end of the discharge tube when installing the bag portion in connection with the vacuum cleaner for use.

BRIEF DESCRIPTION OF DRAWINGS

For a further understanding of the nature and objects of the present invention, reference should be made to the following detailed description, taken in conjunction with the accompanying drawings, in which like elements are given the same or analogous reference numbers and wherein:

FIG. 4 is a perspective view of a second exemplary embodiment of the improved vacuum cleaner bag showing the tube passage opening formed through the second exterior surface and concentrically aligned with the coupling opening and sized to allow passage therethrough of the tube end of the discharge tube; and the molded transparent plastic discharge tube receiving structure attached to the second exterior surface of the bag portion surrounding the tube passage opening and defining a tube end receiving cavity exteriorly of the interior dirt trapping chamber for receiving the tube end when the tube end is sequentially inserted through the coupling opening and then the tube passage opening; the discharge tube receiving structure including a transparent, molded plastic cup member in connection with a flange portion; the flange portion being secured to the second exterior surface; the transparent, molded plastic cup member including a number of accordion folds formed into a cup member sidewall; the figure showing the cup member configured in the collapsed position.

FIG. 5 is a perspective view of the improved vacuum cleaner bag of FIG. 4 with the cup member configured in the expanded position.

FIG. 6 is a perspective view showing a third exemplary embodiment of the improved vacuum cleaner bag showing a different discharge tube receiving structure including a transparent, molded plastic floating plate member in connection with a flange portion by a resilient, expandable gasket member; the flange portion being secured to the second exterior surface.

FIG. 7 is a section view through discharge tube receiving structure of FIG. 6 showing the transparent, molded plastic floating plate member in connection with the flange portion by a resilient, expandable gasket member; the floating plate member being positioned in the retracted position.

FIG. 8 is a second section view through discharge tube receiving structure of FIG. 6 showing the transparent, molded plastic floating plate member in connection with the flange portion by a resilient, expandable gasket member; the floating plate member being positioned in the extended position to form the tube end receiving cavity for receiving the tube end of the discharge tube.

EXEMPLARY MODE FOR CARRYING OUT THE INVENTION

Figure 1:
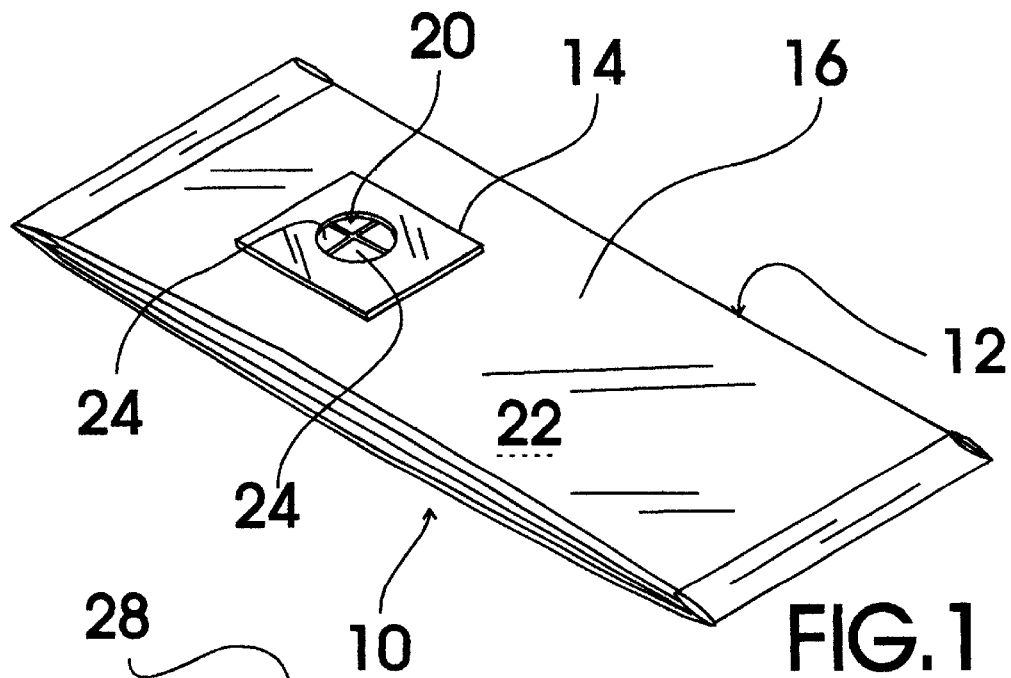
FIG. 1 is a perspective view of a representative prior art vacuum cleaner bag showing a bag portion formed from a filtering material and a first exterior surface to which a substantially rigid rectangular cardboard collar is adhesively attached; the collar surrounding a coupling opening formed through the first exterior surface thereof into an interior dirt trapping chamber of the bag portion by intersecting slashes.
Figure 2:
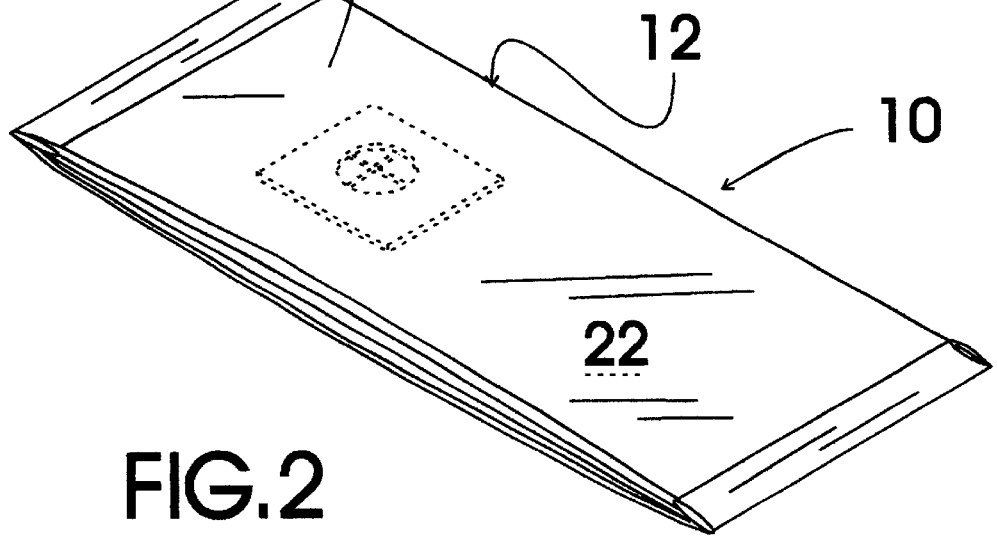
FIG. 2 is a perspective view of the vacuum bag of FIG. 1 showing the second exterior surface of the bag portion positioned opposite the coupling opening and collar (shown by dashed lines in the figure).

FIGS. 1 and 2 show a representative prior art vacuum cleaner bag, generally designated 10, of the type to which the improvements of the invention may be added. Bag 10 includes a bag portion, generally designated 12, formed from a paper filtering material and a rectangular cardboard collar, generally designated 14. Bag portion 12 has a first exterior surface 16 to which cardboard collar 14 is adhesively attached. Cardboard collar 14 has a center opening and surrounds a coupling opening, generally designated 20, formed through first exterior surface 16 into an interior dirt trapping chamber 22 of bag portion 12 by intersecting slashes 24. Bag portion 12 further includes a second exterior surface, generally designated 28, that is positioned opposite coupling opening 20 and collar 14 (shown by dashed lines in FIG. 2).

Figure 3:
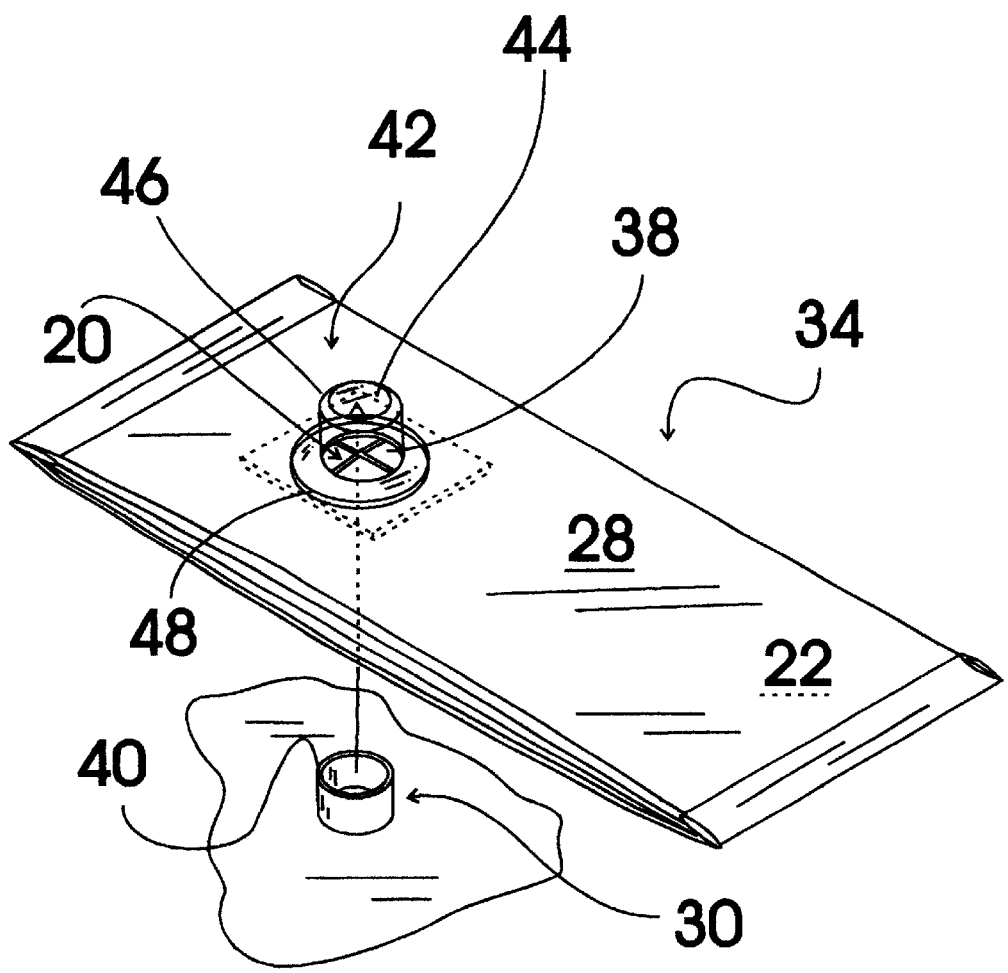
FIG. 3 is an exploded perspective view showing a representative vacuum cleaner discharge tube and a first exemplary embodiment of the improved vacuum cleaner bag showing the tube passage opening formed through the second exterior surface and concentrically aligned with the coupling opening and sized to allow passage therethrough of the tube end of the discharge tube; and the molded transparent plastic discharge tube receiving structure attached to the second exterior surface of the bag portion surrounding the tube passage opening and defining a tube end receiving cavity exteriorly of the interior dirt trapping chamber for receiving the tube end when the tube end is sequentially inserted through the coupling opening and then the tube passage opening; the discharge tube receiving structure including a transparent, molded plastic cup member in connection with a flange portion; the flange portion being secured to the second exterior surface.

FIG. 3 shows a representative vacuum cleaner discharge tube, generally designated 30 to which the improved vacuum cleaner bags of the invention are coupled, a first exemplary embodiment of the improved vacuum cleaner bag, generally designated 34. Improved vacuum cleaner bag 34 includes all of the elements of vacuum cleaner bag 10 plus a tube passage opening, generally designated 38, formed through second exterior surface and concentrically aligned with coupling opening 20 and sized to allow passage therethrough of a tube end 40 of vacuum cleaner discharge tube 30; and a molded transparent plastic discharge tube receiving structure, generally designated 42, that is adhesively attached to second exterior surface 28 surrounding tube passage opening 38. Discharge tube receiving structure 42 defines a cylinder shaped tube end receiving cavity 44 positioned over tube passage opening 38 and exteriorly of interior dirt trapping chamber 22 for receiving tube end 40 when tube end 40 is sequentially inserted through coupling opening 20 and then tube passage opening 38. Discharge tube receiving structure 42 includes a transparent, molded plastic cup member 46 in connection with a flange portion 48. Flange portion 48 is adhesively secured to second exterior surface 28. It can be seen that the user can visually align coupling opening 20 with tube end 40 by viewing through cup member 46 and then apply a positive force down on flange portion 40 without the fear of rupturing or tearing second exterior surface 28 with tube end 40.

FIGS. 4 and 5 each show a perspective view of a second exemplary embodiment of the improved vacuum cleaner bag, generally designated 34a, that is identical to improved vacuum cleaner bag 34 of FIG. 3 except that in this embodiment, cup member 46 includes a number of accordion folds 50 in the sidewall thereof to allow cup member to be positioned in a extended position, shown in FIG. 5, when bag 34a is attached to discharge tube 30 and into a collapsed position, shown in FIG. 4, while improved vacuum cleaner bag 34a is in use.

FIGS. 6,7 and 8 illustrate still another exemplary improved vacuum cleaner bag of the present invention generally designated 34b. Improved vacuum cleaner bag 34b is identical to improved vacuum cleaner bag 34 except that discharge tube receiving structure 42 is replaced by a discharge tube receiving structure, generally designated 42a, that includes a transparent, molded plastic floating plate member 60 in connection with a washer shaped flange portion 62 by a resilient, expandable plastic gasket member 64. Flange portion 62 is adhesively secured to second exterior surface 28. In use, floating plate member 60 is forced up to the position shown in FIG. 8 when bag 34b is attached to discharge tube 30 and into a collapsed position, shown in FIGS. 6 and 7, while improved vacuum cleaner bag 34b is in use.

It can be seen from the preceding description that an improved vacuum cleaner bag has been provided.

It is noted that the embodiments of the vacuum cleaner bag improvement described herein in detail for exemplary purposes are of course subject to many different variations in structure, design, application and methodology. Because many varying and different embodiments may be made within the scope of the inventive concept(s) herein taught, and because many modifications may be made in the embodiment herein detailed in accordance with the descriptive requirements of the law, it is to be understood that the details herein are to be interpreted as illustrative and not in a limiting sense.

What is claimed is:

1. An improvement in a vacuum cleaner bag for use with a vacuum cleaner having a discharge tube, the vacuum cleaner bag including a bag portion formed from a filtering material and having a first exterior surface to which a substantially rigid collar surrounding a coupling opening through the first exterior surface thereof into an interior dirt trapping chamber of the bag portion and through which a tube end of the discharge tube of the vacuum cleaner is inserted to couple the vacuum cleaner bag to the vacuum cleaner and a second exterior surface positioned opposite the coupling opening; said improvement comprising:

a tube passage opening formed through said second exterior surface and concentrically aligned with said coupling opening and sized to allow passage therethrough of the tube end of the discharge tube; and a discharge tube receiving structure attached to said second exterior surface of said bag portion surrounding said tube passage opening and defining a tube end receiving cavity exteriorly of the interior dirt trapping chamber for receiving the tube end when the tube end is sequentially inserted through the coupling opening and then the tube passage opening; the discharge tube receiving structure including a transparent portion positioned to allow a user to see simultaneously through said discharge tube receiving structure, said tube passage opening and the coupling opening to accurately align the coupling opening with the tube end of the discharge tube when installing the bag portion in connection with the vacuum cleaner for use.

2. The improved vacuum cleaner bag of claim 1 wherein:

said discharge tube receiving structure includes a transparent, molded plastic cup member in connection with a flange portion;

said flange portion being secured to the second exterior surface.

3. The improved vacuum cleaner bag of claim 2 wherein:

said transparent, molded plastic cup member includes a number of accordion folds formed into a cup member sidewall and is configurable in a collapsed position and in an expanded position.

4. The improved vacuum cleaner bag of claim 1 wherein:

said discharge tube receiving structure includes a transparent, molded plastic floating plate member in connection with a flange portion by a resilient, expandable gasket member;

said flange portion being secured to the second exterior surface.

* * * * *